(12) United States Patent
Matsubara et al.

(10) Patent No.: US 11,691,563 B2
(45) Date of Patent: Jul. 4, 2023

(54) LIGHT-EMITTING UNIT FOR DOOR MIRROR

(71) Applicant: MISATO INDUSTRIES CO., LTD., Fujioka (JP)

(72) Inventors: Tomoya Matsubara, Isehara (JP); Kenji Arima, Isehara (JP); Takashi Nakatani, Isehara (JP); Lina Yan, Isehara (JP)

(73) Assignee: MISATO INDUSTRIES CO., LTD., Fujioka (JP)

( * ) Notice: Subject to any disclaimer, the term of this patent is extended or adjusted under 35 U.S.C. 154(b) by 0 days.

(21) Appl. No.: 17/788,718

(22) PCT Filed: Dec. 22, 2020

(86) PCT No.: PCT/JP2020/048013
§ 371 (c)(1),
(2) Date: Jun. 23, 2022

(87) PCT Pub. No.: WO2021/132268
PCT Pub. Date: Jul. 1, 2021

(65) Prior Publication Data
US 2023/0024988 A1   Jan. 26, 2023

(30) Foreign Application Priority Data
Dec. 23, 2019 (JP) .................................. 2019-231339

(51) Int. Cl.
*B60Q 1/26* (2006.01)
*F21S 43/14* (2018.01)
(Continued)

(52) U.S. Cl.
CPC .......... *B60Q 1/2665* (2013.01); *B60R 1/1207* (2013.01); *F21S 43/14* (2018.01); *F21V 19/0015* (2013.01); *F21Y 2115/10* (2016.08)

(58) Field of Classification Search
CPC ...... B60Q 1/2665; F21S 43/14; B60R 1/1207; F21V 19/0015
See application file for complete search history.

(56) References Cited

U.S. PATENT DOCUMENTS 7,717,596 B1 * 5/2010 Bell ...................... B60Q 1/381
362/800
7,771,062 B2 * 8/2010 Kuhn ...................... B60R 1/12
362/494
(Continued)

FOREIGN PATENT DOCUMENTS

JP   2017-116992 A   6/2017

OTHER PUBLICATIONS

International Search Report dated Mar. 9, 2021 in PCT/JP2020/048013 filed on Dec. 22, 2020, 2 pages.

*Primary Examiner* — Bryon T Gyllstrom
(74) *Attorney, Agent, or Firm* — Oblon, McClelland, Maier & Neustadt, L.L.P.

(57) ABSTRACT

To provide a light-emitting unit for a door mirror capable of improving a stability of LED's position and connectivity, while reducing a breakage possibility of the LED due to heat. The light-emitting unit for a door mirror is characterized in that it includes a rigid first substrate part having a connector part to receive a signal, and mounts a control unit thereon to cause an LED to emit light based on the signal; a rigid second substrate part provided separately from the first substrate part and mounts the LED thereon; and a connection part connecting the first substrate part to the second substrate part and having a circuit to cause a current signal transmitted from a first substrate part side to reach the LED's side, and the connection part has lower heat transfer rate than heat dissipation rate of the second substrate part.

4 Claims, 5 Drawing Sheets

(51) Int. Cl.
*B60R 1/12* (2006.01)
*F21V 19/00* (2006.01)
*F21Y 115/10* (2016.01)

(56) References Cited

U.S. PATENT DOCUMENTS

| | | | |
|---|---|---|---|
| 9,227,557 B2* | 1/2016 | Chen | B60R 1/1207 |
| 2004/0114384 A1* | 6/2004 | Carter | B60Q 1/381 |
| | | | 359/267 |
| 2008/0212189 A1* | 9/2008 | Baur | B60R 1/088 |
| | | | 362/540 |
| 2016/0207466 A1* | 7/2016 | Lynam | B60R 1/06 |
| 2018/0340673 A1* | 11/2018 | Herrmann | G02B 6/0055 |
| 2020/0215985 A1* | 7/2020 | Lynam | B60R 1/0602 |
| 2022/0153196 A1* | 5/2022 | Lynam | B60R 1/0602 |
| 2022/0169178 A1* | 6/2022 | Herrmann | B60Q 1/2607 |

* cited by examiner

LIGHT-EMITTING UNIT FOR DOOR MIRROR

TECHNICAL FIELD

The present invention relates to a light-emitting unit for a door mirror.

BACKGROUND ART

When in a blind spot of a door mirror or a room mirror of a vehicle another vehicle is running, a light-emitting unit for a door mirror, which performs a Blind Spot Warning (BSW) in order to inform a driver thereof, is known (see, Patent Literature 1, for example).

CITATION LIST

Patent Literature

Patent Literature 1: Japanese Patent Laid-Open Publication No. 2017-116992

SUMMARY OF THE INVENTION

Problems to be Solved by the Invention

In the light-emitting unit for a door mirror as described in the Patent Literature 1, for example, a light emitting unit is provided at a position outward from a vehicle in the backside of a mirror plane of a sideview mirror, it allows to inform that another vehicle is in a blind spot by the light-emitting unit emitting light. In such a light-emitting unit for a door mirror, an LED (Light Emitting Diode) and a control unit for turning on the LED are mounted on the same rigid substrate, for example.

However, in such a light-emitting unit for a door mirror, the control unit likely generates heat, and heat from the control unit is easily transferred to the LED through the rigid substrate because the LED and control unit are mounted on the same rigid substrate. The transferred heat may cause the breakage of the LED.

Accordingly, it is considered that a flexible printed substrate which has a smaller cross section and a smaller heat conduction than the rigid substrate is used instead. However, when the flexible printed substrate is used, the position of the LED is likely unstable and not suitable for connection to connectors.

The present invention has been made to solve these conventional problems, and the objects of the same is to provide a light-emitting unit for a door mirror capable of improving position stability of the LED and connectivity to connectors, as well as reducing the possibility of LED breakage due to heat generated in the control unit.

Means for Solving the Problem

The present invention is directed to a light-emitting unit for a door mirror, which is provided on a backside of a mirror plane of the door mirror and emits light in response to a signal from a vehicle side, includes: a rigid first substrate part that has a connector part to receive the signal from the vehicle side, and mounts a control unit thereon to cause an LED to emit light based on the signal from the vehicle side; a rigid second substrate part that is provided separately from the first substrate part and mounts the LED thereon; and a connection part that connects the first substrate part to the second substrate part and has a circuit to cause a current signal transmitted from a first substrate part side to reach the LED's side, wherein the connection part has lower heat transfer rate than heat dissipation rate of the second substrate part.

Effect of the Invention

According to the present invention, since the connection part connecting the first substrate part and the second substrate part has a lower heat transfer rate than a heat dissipation rate of the second substrate part. Therefore, even if the heat generated by the control unit is transferred to the LED's side, since the heat dissipation rate is more superior, the breakage possibility of the LED by the heat from the control unit can be reduced. Also, since both the first and second substrate parts and have a rigid property, the position of the LED is less likely to be unstable, so that connector connection can be easier to make. As a result, this makes it possible to improve the stability of the LED position and the connectivity to the connector part, as well as to reduce the breakage possibility of the LED due to the heat generated in the control unit.

MODE FOR CARRYING OUT THE INVENTION

Now, the present invention is described below according to a preferred embodiment. The present invention is not limited to the embodiments described below, and can be modified as appropriate within a range of not departing from the scope of the present invention. In the embodiments described below, although illustration and explanation of a part of configurations are omitted, it is needless to say that publicly known or generally known technologies are applied as appropriate to the details of the omitted technologies in a range without discrepancy with description below.

Figure 1:
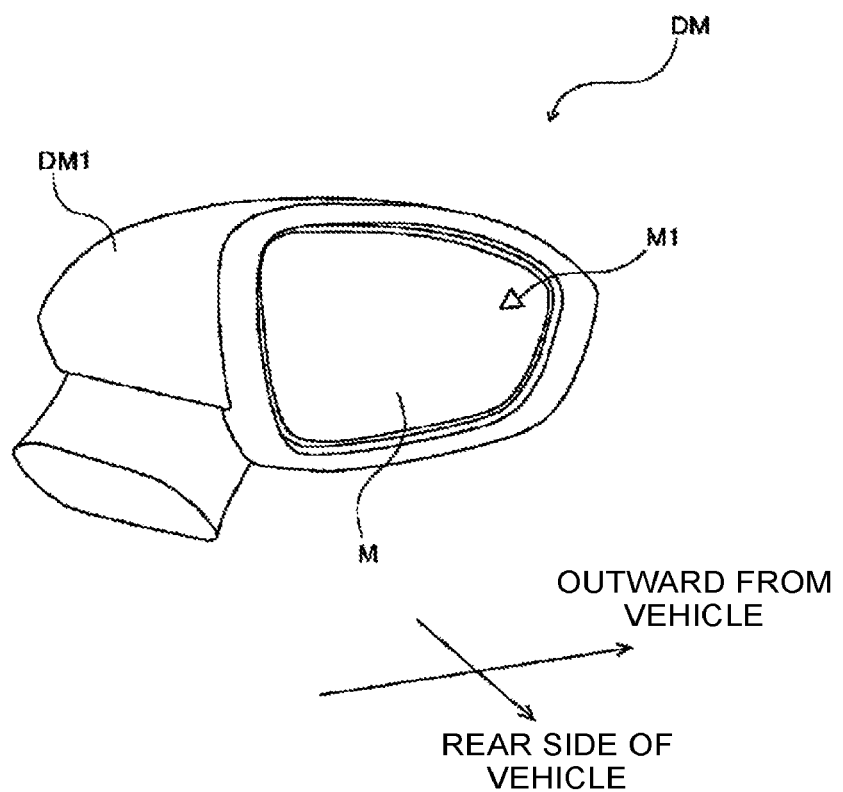
FIG. 1 is a perspective view illustrating a door mirror including a light-emitting unit for a door mirror according to the present embodiment.
Figure 2:
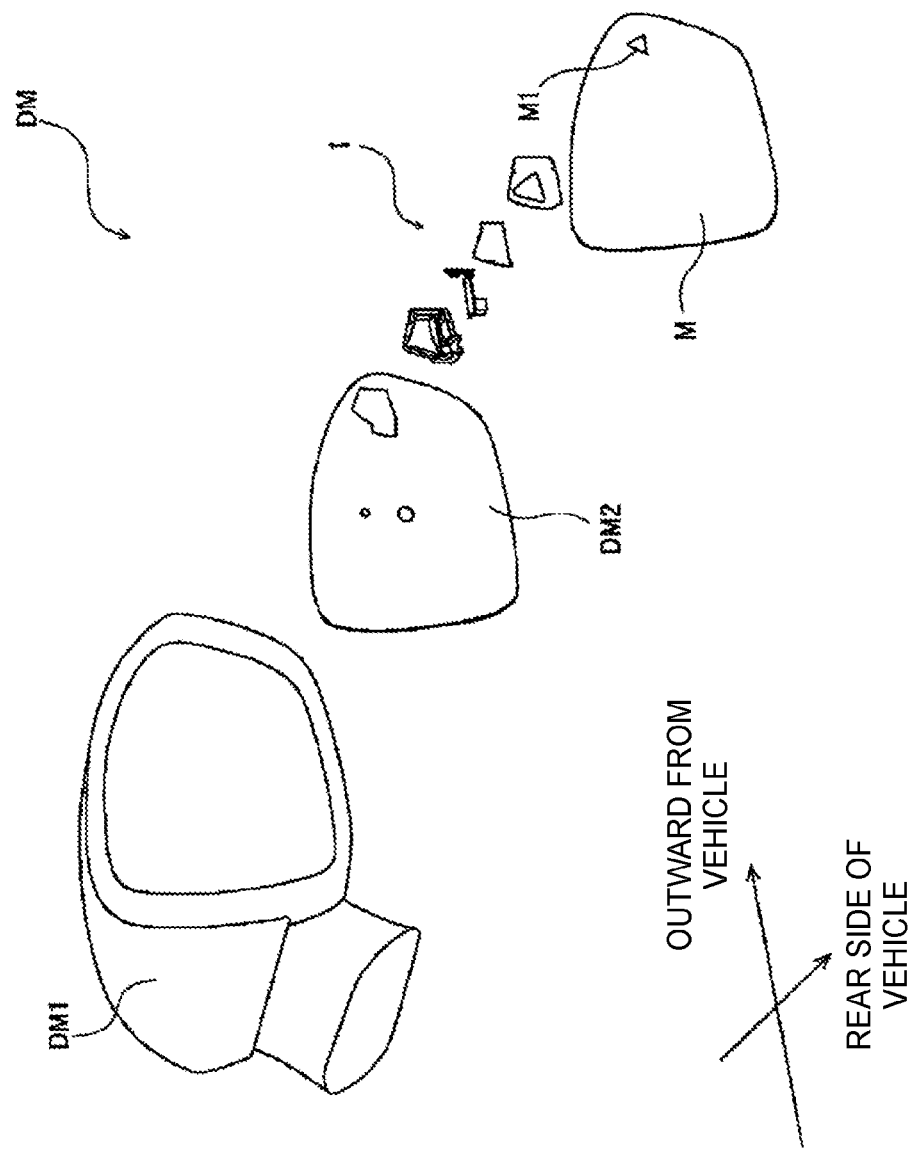
FIG. 2 is an exploded perspective view of the light-emitting unit for a door mirror shown in FIG. 1.

FIG. 1 is a perspective view illustrating a door mirror including a light-emitting unit for a door mirror according to the present embodiment. FIG. 2 is an exploded perspective view of the door mirror illustrated in FIG. 1. In the following embodiments, the right side door mirror is described as an example, and explanation of the left side door mirror is omitted. However, it is needless to say that the left side door mirror has basically the same configuration as the right side one in a laterally symmetrical manner.

The door mirror DM shown in FIG. 1 is attached to a vehicle such as a car to provide a driver and the like with a rear view of the vehicle. Such a door mirror DM insides housing DM1 and mirror M, containing base member DM2 and light-emitting unit for the door mirror 1 inside.

The light-emitting unit for a door mirror 1 is provided in the housing DM1, i.e., on the backside of the mirror M of the door mirror DM (backside of a mirror plane) and emits light in response to a signal from the vehicle side, and emits light according to instructions from the vehicle when another vehicle or the like is present in a position which becomes a blind spot for both a room mirror and the door mirror DM. A triangular-shaped light-transmission part M1 is formed in the mirror M, for example, and when the light-emitting unit for a door mirror 1 emits light, the light-transmission part M1 is illuminated in a triangular shape to warn the driver of presence of another vehicle or the like in the blind spot.

In particular, the light-emitting unit for the door mirror 1 and the light-transmission part M1 are provided at a position outward from the vehicle in the door mirror DM, so that warning can be performed at a position hardly interfering the driver's rear view when warning using the light-transmission part M1. Such a light-emitting unit for a door mirror 1 is attached to the base member DM2 shown in FIG. 2.

Figure 3:
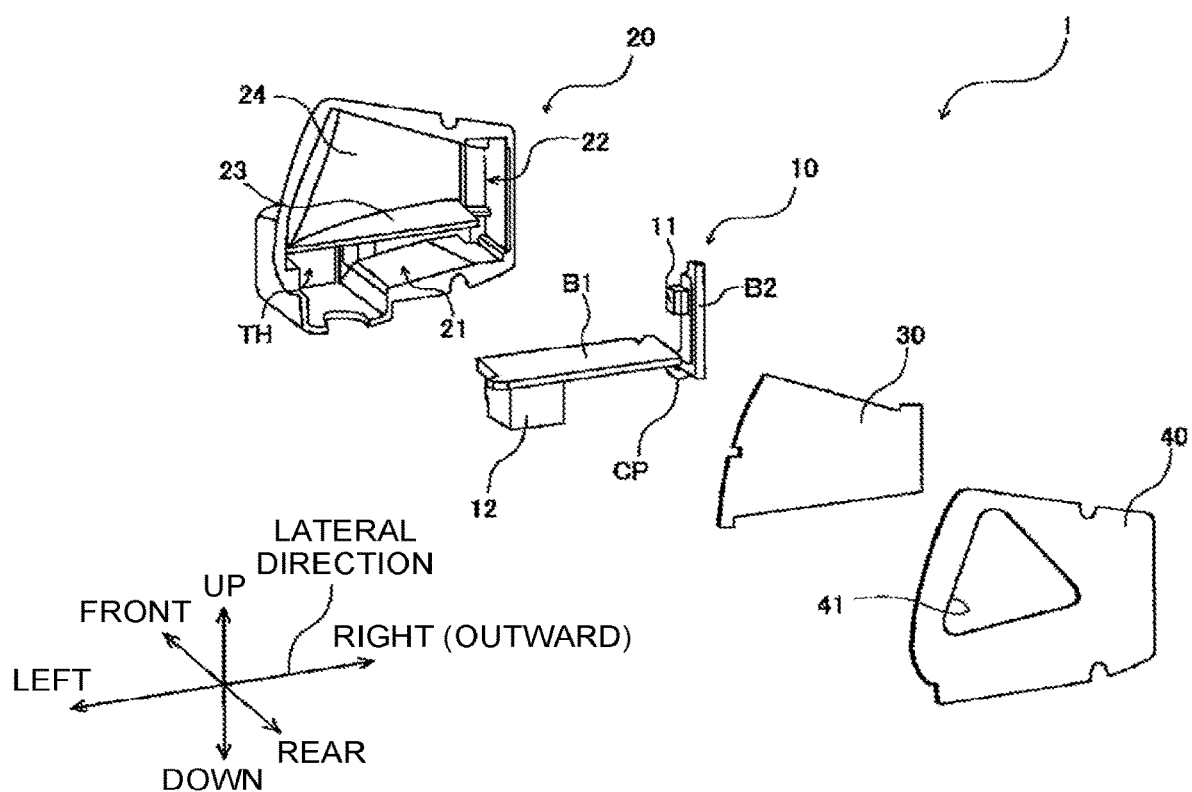
FIG. 3 is an enlarged exploded perspective view of the light-emitting unit for a door mirror shown in FIG. 2.

FIG. 3 is an enlarged exploded perspective view of the light-emitting unit for a door mirror 1 shown in FIG. 2. As shown in FIG. 3, the light-emitting unit for a door mirror 1 includes LED assembly 10, open housing 20, diffusion plate 30, and shading plate 40.

Figure 4:
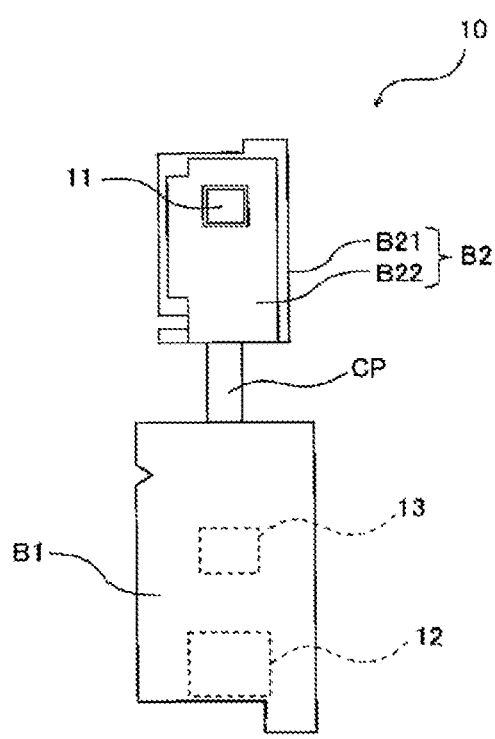
FIG. 4 is a development plan view illustrating an LED assembly shown in FIG. 3.

The LED assembly 10 mounts an LED 11 to emit light according to instructions from the vehicle side. FIG. 4 is a development plan view illustrating the LED assembly 10 shown in FIG. 3. The LED assembly 10 shown in FIGS. 3 and 4 includes rigid first substrate part B1, rigid second substrate part B2, and flexible connection part CP.

The first substrate part B1 is a substantially rectangular shaped substrate which mounts the connector part 12 to receive a signal from the vehicle side and the control unit 13 to cause the LED 11 to emit light based on the signal from the vehicle side. The second substrate part B2 is provided separately from the first substrate part B1, and It is a substantially rectangular shaped substrate on which the LED 11 is mounted. The connection part CP is composed of a flexible printed substrate, for example, and connects the first substrate part B1 and the second substrate part B2. The connection part CP has a circuit which allows a current signal transmitted from the first substrate part B1 side to reach the LED 11 side. The connection part CP is not limited to the flexible printed substrate, but may be composed of other members such as conductive wires, for example.

Furthermore, the second substrate part B2 includes aluminum plate B21 made of aluminum and insulation substrate B22 provided on the aluminum plate B21. In particular, the second substrate part B2 is enhanced in heat dissipation because it is equipped with the aluminum plate B21. Since the aluminum plate B21 has rigid property, the insulation substrate B22 is not limited to a rigid substrate, but may be composed of a flexible printed substrate. In particular, if the insulation substrate B22 is composed of a flexible printed substrate, the insulation substrate B22 may be configured integrally with the connection part CP.

Furthermore, in the present embodiment the connection part CP is composed of substance with a lower heat transfer rate than heat dissipation rate of the second substrate part B2 (e.g., heat dissipation rate at room temperature about 23° C.). This makes it possible to reduce the possibility of breakage of the LED 11 due to heat generated in the control unit 13. Namely, since the amount of heat, which is generated in the control unit 13 and reaches the second substrate part B2 side through the connection part CP, never exceeds the amount of heat dissipated in the second substrate part B2, it makes heat difficult to accumulate on the second substrate part B2 side. As a result, it is possible to reduce the possibility of breakage of the LED 11.

Figure 5:
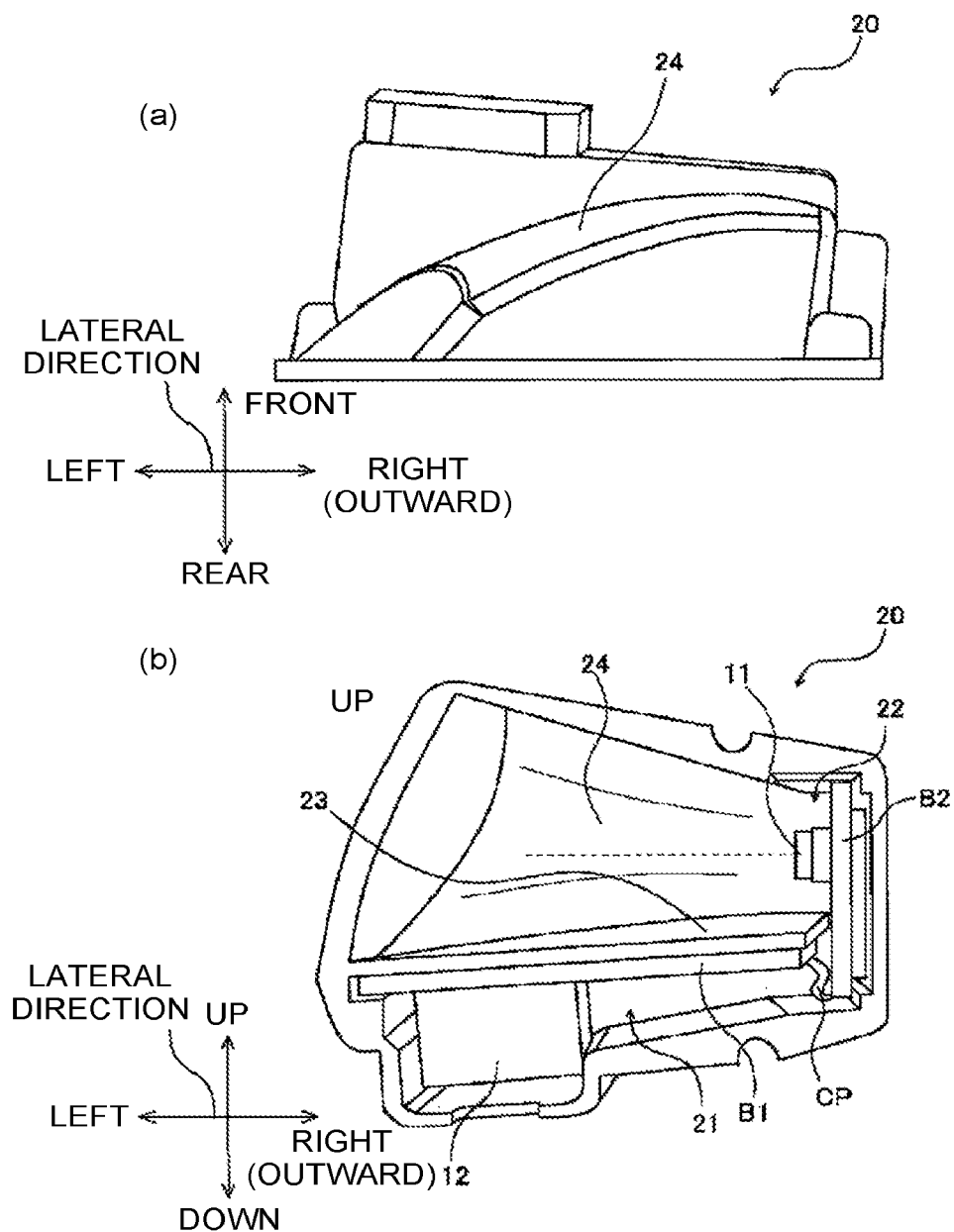
FIG. 5 is a configuration view of an open housing shown in FIG. 3, (a) and (b) show a plan view and a front view, respectively.

The open housing 20 shown in FIG. 3 has first mount part 21 for installing the first substrate part B1 and second mount part 22 for installing the second substrate part B2. FIG. 5 is a configuration view of the open housing 20 shown in FIG. 3, (a) and (b) show a plan view and a front view, respectively. FIG. 5(b) shows the LED assembly 10 with being assembled in the open housing 20.

As shown in FIGS. 3 and 5, the first mount part 21 accommodates the first substrate part B1 so that a longitudinal direction of the first substrate part B1 aligns with a left-right direction of the vehicle and a substrate surface thereof becomes to substantially horizontal. The first mount part 21 is provided at a lower portion with respect to the vehicle in the open housing 20. A through hole TH is formed at a left end of the first mount part 21 so that the connector part 12 faces the through hole TH when the first substrate part B1 is installed in the first mount part 21. This allows the connector part 12 to fit with a counterpart connector from a front side with respect to the vehicle through the through hole TH.

The second mount part 22 accommodates the second substrate part B2 so that a longitudinal direction of the second substrate part B2 aligns with a up-down direction of the vehicle and a substrate surface thereof aligns with both front-rear and up-down directions of the vehicle. The second mount part 22 is provided at an outward portion with respect to the vehicle in the open housing 20. The second substrate part B2 is located so that an optical axis of the LED 11 aligns with a lateral direction (left direction) of the vehicle.

In addition, the open housing 20 has partition wall 23 and reflector 24. The partition wall 23 is a plate member to separate the first substrate part B1 from the second substrate part B2. In more detail, the partition wall 23 separates a mounting portion of the control unit 13 of the first substrate part B1 from the mounting portion of the LED 11 of the second substrate part B2. As a result, the heat from the control unit 13 is blocked by the partition wall 23, and thus making it difficult to transfer the heat to the LED 11.

The reflector 24 has a reflective surface on the basis of a rotating paraboloidal surface formed by carrying out aluminum vapor deposition treatment or the like, and reflects light from the LED 11. In the present embodiment, the optical axis of the LED 11 is directed toward a left direction of the vehicle, and the reflector 24 reflects the light emitted from the LED 11 toward the left direction of the vehicle, toward a rear direction of the vehicle (mirror M side) or toward the driver.

FIG. 3 is referred again. The diffusion plate 30 is attached to the open housing 20 in which the LED assembly 10 is assembled, accepts the light emitted from the LED 11 and reflected by the reflector 24, and diffuses it to emit.

The shading plate 40 blocks light in areas other than an aperture 41 formed by hollowing out. The aperture 41 has a triangular shape similar to the light-transmission part M1 of the mirror M.

Next, working of the light-emitting unit for a door mirror 1 according to the present embodiment is described below. First, when assembling the light-emitting unit for a door mirror 1 according to the present embodiment, the LED assembly 10 is prepared and accommodated into the open housing 20. In this case, the second substrate part B2 is installed in the second mount part 22. Here, since the second substrate part B2 has rigid property, the position of the LED 11 mounted on the second substrate part B2 is stable.

Furthermore, the diffusion plate 30 and the shading plate 40 are mounted on the open housing 20 in which the LED assembly 10 is mounted, so that the connector part 12 is connected to the counterpart connector. In this case, since the connector part 12 is also mounted on the rigid first substrate part B1, compared to the case where the connector part 12 is mounted only on a flexible printed substrate, it is easier to carry out connector connection.

It is assumed that another vehicle is detected in the vehicle's blind spot while the vehicle is running. In this case, a current signal is supplied from the vehicle side. The control unit 13 receives the current signal through the connector part 12, and causes the LED 11 to emit light. In this case, the control unit 13 may, based on the current signal from the vehicle side, carry out a process or the like for causing the LEDs 11 of the left and right door mirrors DM to emit light in the same manner, for example.

When performing such a process, heat is generated in the control unit 13. The heat is transferred from the first substrate part B1 to the LED 11 through the connection part CP and the second substrate part B2. However, in the present embodiment, the heat transfer rate of the connection part CP is lower than the heat dissipation rate of the second substrate part B2. Therefore, even if the heat generated in the control unit 13 reaches the second substrate part B2 from the first substrate part B1 through the connection part CP, the heat is dissipated in the second substrate part B2. Furthermore, since the heat dissipation rate is higher than the heat transfer rate, it is also advantageous in terms of heat balance. Moreover, the heat generated in the control unit 13 and released into the air is blocked by the partition wall 23, and thus making it difficult to transfer the heat to the LED 11. Thus, it results in that the breakage possibility of the LED 11 can be reduced.

In this way, according to the light-emitting unit for a door mirror 1, the connection part CP connecting the first substrate part B1 and the second substrate part B2 has a lower heat transfer rate than the heat dissipation rate of the second substrate part B2. Therefore, even if the heat generated by the control unit 13 is transferred to the LED 11's side, since the heat dissipation rate is more superior, the breakage possibility of the LED 11 by the heat from the control unit 13 can be reduced. Also, since both the first and second substrate parts B1 and B2 have a rigid property, the position of the LED 11 is less likely to be unstable, so that connector connection can be easier to make. Therefore, this makes it possible to improve the stability of the LED position and the connectivity to the connector part 12, as well as to reduce the breakage possibility of the LED 11 due to the heat generated in the control unit 13.

Furthermore, in the case where the first substrate part B1 and the second substrate part B2 are integrated (e.g., a single substrate), a large space in the front-rear direction with respect to the vehicle is required for the installation of the substrate part. However, in the case where the first substrate part B1 and the second substrate part B2 are separate, a space can be reduced in the front-rear direction with respect to the vehicle for the installation of the second substrate part B2, since the second substrate part B2 can be located so that the optical axis of LED 11 aligns with the lateral direction of the vehicle and the reflector 24 reflects the light from the LED 11 toward the mirror M. Thus, it can contribute to reduction of installation space.

In particular, the light-emitting unit for a door mirror 1 is installed in a position outward from the vehicle in the door mirror DM. In the door mirror DM in which a space in the front-rear direction with respect to the vehicle is limited due to a design shape thereof, installation space reduction can be made more efficiently.

In addition, since the partition wall 23 is provided to separate the first substrate part B1 from the second substrate part B2, the heat from the first substrate part B1 can be easily blocked by the partition wall 23. This makes it possible to further reduce the possibility of breakage of the LED 11 due to heat generated in the control unit 13.

Furthermore, since the second substrate part B2 includes an aluminum plate B21, the heat can be efficiently dissipated from the aluminum plate B21, and thus further reducing the possibility of breakage of the LED 11 due to the heat generated in the control unit 13.

Although the present invention has been described based on the embodiments, the invention is not limited to the above mentioned embodiments, but may be modified without departing from the gist of the invention. Also, techniques of the embodiments may be combined with each other, and publicly known or generally-known techniques may be combined to the invention.

For example, in the above mentioned embodiments, the light-emitting unit for a door mirror 1 has a diffusion plate 30, but the invention is not limited thereto. It may not have a diffusion plate 30. In addition, the LED assembly 10 according to the present embodiment is composed of two substrates consisting of a first substrate part B1 and a second substrate part B2, but it is not limited thereto. It may have three or more substrate parts.

Furthermore, in the above mentioned embodiments, the light-emitting unit for a door mirror 1 has the reflector 24, but the invention is not limited thereto. It may not have the reflector 24.

DESCRIPTION OF REFERENCE NUMERALS

1 . . . Light-emitting unit for a door mirror
11 . . . LED
12 . . . Connector part
13 . . . Control unit
23 . . . Partition wall
24 . . . Reflector
B1 . . . First substrate part
B2 . . . Second substrate part
B21 . . . Aluminum plate
CP . . . Connection part
DM . . . Door mirror
M . . . Mirror

The invention claimed is:

1. A light-emitting unit for a door mirror that is provided on a backside of a mirror plane of the door mirror and emits light in response to a signal from a vehicle side, the light-emitting unit for a door mirror comprising:

a rigid first substrate part that has a connector part to receive the signal from the vehicle side, and mounts a control unit thereon to cause an LED to emit light based on the signal from the vehicle side;

a rigid second substrate part that is provided separately from the first substrate part and mounts the LED thereon; and a connection part that connects the first substrate part to the second substrate part and has a circuit to cause a current signal transmitted from the first substrate part's side to reach the LED's side, wherein the connection part has lower heat transfer rate than heat dissipation rate of the second substrate part.

2. The light-emitting unit for a door mirror according to claim 1, the light-emitting unit for a door mirror further comprising a reflector to reflect light emitted from the LED, wherein the second substrate part is located so that an optical axis of the LED aligns with a lateral direction of the vehicle and a substrate surface thereof is along a front-rear direction of the vehicle, and the reflector reflects the light emitted from the LED toward the mirror plane side of the door mirror.

3. The light-emitting unit for a door mirror according to claim 1, the light-emitting unit for a door mirror further comprising a partition wall to separate the first substrate part from the second substrate part.

4. The light-emitting unit for a door mirror according to claim 1, wherein the second substrate part includes an aluminum plate made of aluminum.

\* \* \* \* \*